(12) United States Patent  
Shoemake et al.

(10) Patent No.: US 7,200,178 B2  
(45) Date of Patent: Apr. 3, 2007

(54) METHODS FOR OPTIMIZING TIME VARIANT COMMUNICATION CHANNELS

(75) Inventors: Matthew B. Shoemake, Allen, TX (US); Nasir Ahmed, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 553 days.

(21) Appl. No.: 10/439,770

(22) Filed: May 16, 2003

(65) Prior Publication Data

US 2003/0231715 A1 Dec. 18, 2003

Related U.S. Application Data

(60) Provisional application No. 60/387,965, filed on Jun. 12, 2002.

(51) Int. Cl.
*H04K 1/10* (2006.01)
*H04L 27/28* (2006.01)

(52) U.S. Cl. .................. 375/260; 375/267; 375/299

(58) Field of Classification Search ................ 375/260, 375/267, 227, 225, 299; 370/210, 330, 208
See application file for complete search history.

(56) References Cited

U.S. PATENT DOCUMENTS 6,956,835 B2 * 10/2005 Tong et al. ................. 370/330

2002/0154705 A1 * 10/2002 Walton et al. .............. 375/267
2003/0218973 A1 * 11/2003 Oprea et al. ................ 370/210
2004/0081127 A1 * 4/2004 Gardner et al. ............. 370/338
2004/0141548 A1 * 7/2004 Shattil ........................ 375/146

* cited by examiner

*Primary Examiner*—Phuong Phu
(74) *Attorney, Agent, or Firm*—Steven A. Shaw; W. James Brady; Frederick J. Telecky, Jr.

(57) ABSTRACT

Methods and apparatus for optimizing wireless communications channels by employing multi-channel modulation techniques in wireless communication systems is disclosed. The wireless communications channel may comprise tones, and data may be allocated differently among the different tones according to the channel characterization measurements. In one embodiment, a method may include: transmitting data over a wireless channel using a first station (e.g., an access point), receiving the data using a second station, performing calculations on the received data, and allocating subsequent data transmissions among the tones according to the calculations. Other embodiments may utilize superfluous data transmissions—for example, data coming from the access point that is intended for other stations—in order to calculate channel characterization. Preferably, any portion of the transmitted data (e.g., preamble, header, data, etc.) may be used to calculate channel characterization.

32 Claims, 1 Drawing Sheet

METHODS FOR OPTIMIZING TIME VARIANT COMMUNICATION CHANNELS

CROSS-REFERENCE TO RELATED APPLICATIONS

This application is a non-provisional application claiming priority to provisional application Ser. No. 60/387,965 filed on Jun. 12, 2002 and incorporated herein by reference.

STATEMENT REGARDING FEDERALLY SPONSORED RESEARCH OR DEVELOPMENT

Not applicable.

BACKGROUND OF THE INVENTION

1. Technical Field of the Invention

The present invention relates generally to communications systems and more particularly to methods and apparatus for utilizing the bandwidth of a communication channel more effectively.

2. Description of Related Art

Communication systems generally have at least two entities communicating with each other through a medium (channel). In some systems, one entity may be a transmitter while the other entity is a receiver, enabling one-way communication. In other systems, two-way communication may be enabled by the entities being capable of both transmitting and receiving, one transmitter sending communication signals to at least one receiver through some kind of medium or channel. In the context of a computer-based communication system, two or more computers may communicate with each other where a transmitting computer sends data to a receiving computer. While many possible channels exist for communicating between computers, they generally fall into two categories, wireline and wireless.

Multi-Channel Modulation

Multi-channel modulation (MCM) is a generic term describing a technique for dividing the entire bandwidth of a channel into multiple subcarriers, where each subcarrier does not interfere with the others. When the subcarriers are used to represent different frequencies (referred to as "tones"), this technique is referred to as frequency division modulation (FDM), and if each tone is orthogonal to the others (so that intertone interference is minimized), then this technique is referred to as orthogonal frequency domain modulation (OFDM). One example of an OFDM system is the IEEE 802.11 g wireless local area network (WLAN) standard.

The spacing between adjacent tones preferably is selected to be the inverse of the symbol period so that each tone is orthogonal and non-interfering with other tones. Note while the tone spacing may be larger, the inverse of the symbol period represents a lower limit of tone separation in that spacing the tones closer than this value may induce intertone interference. Information is transmitted by modulating the phase and amplitude of each tone. Typically each tone is modulated with a symbol from a discrete set such as a phase shift keying (PSK) or quadrature amplitude modulation (QAM) constellation.

One popular implementation of MCM used in telecommunications systems is in digital subscriber lines (DSLs). These services provide data bandwidth to subscribers for services such as broadcast video, video on demand, as well as many other bandwidth intensive services. The physical implementation of DSL involves a wireline connection between the telecommunications provider and the subscriber. These wireline channels often include copper loops used in telephone subscriber lines. Due to varying channel conditions, information capacity of each tone may vary. For example, the path loss from the transmitter to the receiver for each tone may not be constant. In part, this is due to the receiver receiving both the transmitted signal and the reflections of the transmitted signal, which causes deleterious reception of the transmitted signal.

Channel Optimization

Because the tones within the channel may have different gain and distortion characteristics, the information capacity of each tone tends to vary. The aggregate capacity of the channel may be increased by allocating different power and/or bits to each tone. The maximum data capacity of a tone is a function of the channel gain and the power used in transmit on that tone. As such, the optimal power distribution for the channel must be achieved to reach the channel capacity. Power may be allocated uniformly as an engineering tradeoff, but unless the gains on each tone are equal, this will result in some loss. Bits must also be allocated optimally on each tone. One method for efficiently allocating the data to each tone of the channel is to use a "bit loading" algorithm, which allocates an appropriate number of bits to each tone based on that tone's characteristics (such as distortion), in order operate as close to the channel capacity as possible, and thereby optimize the use of the resource.

In DSL applications, MCM techniques may be used to optimally adapt the communications channel so that each tone may carry a different QAM size constellation (i.e., bit loading) based on the channel's measured signal-to-noise ratio (SNR). In performing the bit loading, the SNR of each tone is estimated during a training phase when the system is initially configured. Based on this estimation, the appropriate bit loading is assigned to the tones within the channel to maximize the channel's throughput. In a wired communications system such as DSL, the channel is considered stable because the channel's characteristics do not vary with time. Implementing MCM in stable or static channels allows the channel characteristics to be estimated when the system is initially configured so that bit loading may later be performed across the tones.

MCM techniques are also used in wireless systems, such as in wireless local area networks (WLANs) employing the 802.11 standard. However, wireless systems are not amicable to bit loading optimization techniques because their transmission characteristics may vary with time and are thus considered unstable. For example, a laptop computer communicating with a stationary computer using a wireless connection may be moved to different geographic locations within the WLAN at different times. In such systems, initial estimates of a tone's characteristics (e.g., SNR) are subject to change so that wireless standards, such as the 802.11 standard, do not support bit loading techniques. Techniques for employing channel optimization, such as bit loading, in wireless communications systems would be highly desirable because these techniques would enable the system to operate closer to optimum capacity. Yet, implementing channel optimization techniques may be difficult.

BRIEF SUMMARY OF THE PREFERRED EMBODIMENTS

A method and apparatus for optimizing wireless communications channels by employing multi-channel modulation techniques in wireless communication systems is disclosed. The wireless communications channel may comprise tones, and data may be allocated differently among the multiple tones according to the parameter estimates. In one embodiment, a method may include: transmitting data over a wireless channel using a first station (e.g., an access point), receiving the data using a second station, performing calculations on the received data, and allocating subsequent data transmissions among the tones according to the calculations. Other embodiments may utilize superfluous data transmissions—for example, data coming from the access point that is intended for other stations—in order to calculate channel characterization. Preferably any portion of the transmitted data (e.g., preamble, header, data, etc.) may be used to calculate channel characterization.

In another embodiment, a channel's characterization may be determined by examining the data that is used in coordinating which station has control of the channel. The access point (AP) may send out beacons periodically. The beacon preferably includes channel control information such as the name of the access point and the capabilities of the access point. These beacons may be used by the stations on the network to characterize the channel between the AP and each station. By monitoring these beacons, the station may maintain an updated estimate of the channel, so that when it needs to transmit data, that data may be bitloaded based on the knowledge of the gained via these beacons.

BRIEF DESCRIPTION OF THE DRAWINGS

For a more detailed description of the present invention, reference will now be made to the accompanying drawings, wherein.

NOTATION AND NOMECLATURE

Figure 1:
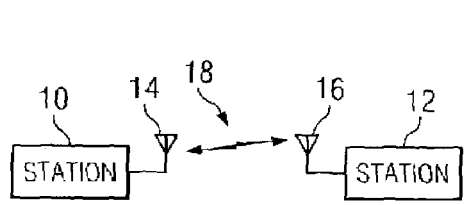
FIG. 1 shows one example of a single input, single output antenna configuration.

Certain terms are used throughout the following description and claims to refer to particular system components. As one skilled in the art will appreciate, semiconductor companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical or wireless connection. Thus, if a first device couples to a second device, that connection may be through a direct electrical connection, or through an indirect electrical or wireless connection via other devices and connections.

The term "bitloading" refers to a method of efficiently allocating the tones in a channel. This may include allocating power among each tone and/or varying the number of information bits as well as modulation and coding scheme used on each tone.

The term "frame" refers to a basic communication structure that includes preamble or header information and data information. The term "data unit" simply refers to a segment of data comprising one or more bits. The term "channel" refers to the medium in which transmissions occur. For example, in wireless communication environments, such as WLANs, this medium is free space. Also, the term "bandwidth" is used to designate a range of frequencies that may be used in a channel, where individual frequencies within this range are referred to as "tones." To the extent that any term is not specially defined in this specification, the intent is that the term is to be given its plain and ordinary meaning.

DETAILED DESCRIPTION OF PREFERRED EMBODIMENTS

The preferred embodiments of the present invention will be described below in the context of the 802.11 family of wireless standards, however it should be noted that the embodiments disclosed herein are equally applicable in other wireless standards. The 802.11 standard is formally known as the "ISO/IEC 8802-11 International Standard (ANSI/IEEE Std 802.11)" referred to herein as the "802.11 standard" for sake of convenience and incorporated herein by reference. It provides wireless medium access control (MAC) and physical layer (PHY) specifications. The 802.11e amendment to the 802.11 standard, is incorporated herein by reference and defines MAC enhancements for quality of service (QoS). QoS generally refers to a set of services that permit multiple applications to run concurrently with the network infrastructure treating each application differently in terms of latency, bandwidth, priority, etc. QoS permits multiple applications to run with a total bandwidth that otherwise may not be enough to accommodate the needs of the applications. QoS permits, for example, a more latency-intolerant application to be run in a way that acknowledges and addresses the special latency requirements of that application relative to other applications. In general, network resources are allocated in a way that considers the special needs of the applications. To this end, QoS strives to ensure a certain throughput level and that end-to-end latency does not exceed a specified threshold.

Wireless Networks

To implement a wireless network, each device (computer, access point, etc.) may include one or more antennas through which data is transmitted or received. One type of antenna configuration is referred to as single input, single output (SISO) and is depicted conceptually in FIG. 1. Two network stations 10 and 12 are shown in communication with each other. The stations could be computers, access points, and the like. In a SISO configuration, each station 10 and 12 includes a single antenna 14 and 16, respectively. Data is communicated between the stations 10, 12 in an exchange sequence via the single wireless link 18.

Figure 2:
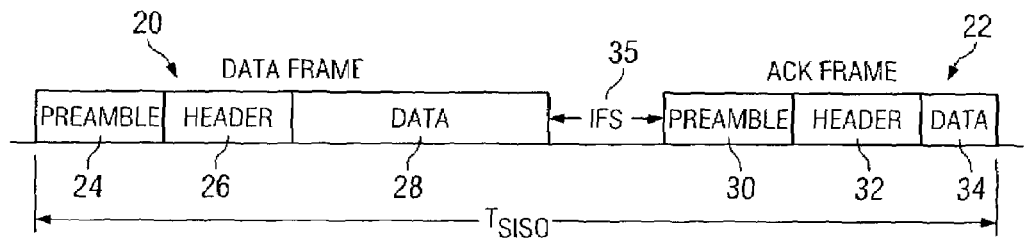
FIG. 2 shows an exemplary exchange sequence.

An exemplary exchange sequence is illustrated in FIG. 2. One of the stations 10, 12 sends a data frame 20 to the other station which responds with an acknowledgment frame 22. The data frame 20 may include a preamble 24, a header 26 and a data payload 28. Similarly, the acknowledgment frame 22 includes a preamble 30, a header 32 and a data payload 34. The data frame 20 conveys data to the receiving station and the acknowledgment frame 22 permits the sending station to know that the data frame was correctly received. If the data frame was not correctly received (e.g., due to noise or interference), the sending station may resend the data frame.

Figure 3:
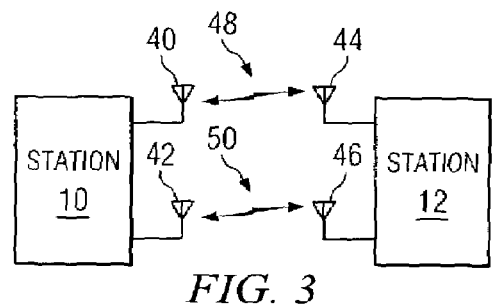
FIG. 3 shows one example of a multiple input, multiple output antenna configuration.

The total elapsed time required for the data frame 20 and subsequent acknowledgment frame 22 to be transmitted in a SISO antenna configuration is shown in FIG. 2 as time $T_{SISO}$. To a certain extent, the information contained in data frame 20 may be transmitted in less time using a multiple input, multiple output (MIMO) configuration such as that shown in FIG. 3. As shown, stations 10, 12 each include a pair of antennas that communicate with the pair antennas on the other station. For example, antenna 40 and 42 can transmit simultaneously. The transmitted signals are then received on 44 and 46. Due to varying channel conditions between each antenna, the transmissions from antenna 40 and 42 can be separated upon reception thereby establishing two simultaneously available communication links between stations 10 and 12 in a duplex communications fashion. This type of MIMO configuration is referred to as a "2×2" MIMO configuration. Other types of MIMO configurations exist in which more than two antennas at each station are implemented such as an "N×M" configuration where M and N may be any integer number.

Operation

In some of the embodiments of the present invention, training sequences are transmitted within the data frame 20. In one embodiment, the preamble 24 includes training sequences used by the receiver to estimate the characteristics of each tone. Preferably, the preamble 24 is used by the receiver to calculate each tone's characteristics such as SNR and phase noise. Assuming a symmetric channel response between transmitting and receiving antennas, the estimation made using the preamble 24 in data frame 20 may be subsequently used by the receiving station to transmit the acknowledgment frame 22 using channel optimization techniques.

For example, suppose that station 10 transmits data frame 20 and station 12 receives it, and uses the preamble 24 to estimate each tone's characteristics within the channel 18. When station 12 subsequently sends data to station 10 using channel 18, the initial estimations made using preamble 24 may be used to optimize the data sent from station 12 by bit loading the tones which may or may not include varying the power allocation on each tone. Due to the movement of nodes and objects that cause multipath reflections, the estimate of a channel is valid for a finite amount of time known as the "coherence time." In a WLAN channel, this coherence time is typically in the range of approximately 10 to 100 milliseconds.

In other embodiments, channel characterization calculations may be performed using the header 26 or data 28 of data frame 20. Preferably, a cumulative averaging technique may be employed so that the channel characterization can be performed over multiple data frames and acknowledgement frames. The receiving station calculates the channel's characterization using a first acknowledgement frame and create a cumulative average with subsequent acknowledgement frames. Then the receiving station accesses the cumulative average of the channel's characterization to enable optimal calculation of the power level and modulation type for each tone.

In another embodiment, the transmitted data may also include information on how the tones are loaded. In this manner, a station that receives this data may choose to use the identical bit loading technique without performing any calculations, and possibly capitalize on symmetries that exist within the channel.

Transmission between two communicating stations may occur at different power levels. However, in order to properly estimate the channel gain and SNR for bit loading purposes, knowledge of the power level may be desired. Preferably, the data transmitted also includes the power level for each transmission. In one embodiment, the power level information is represented using a reduced number of bits so that more of the available bandwidth may be used for data transmission.

In addition, each receiver may have a different sensitivity level. Therefore, in order to properly estimate the channel gain and SNR for bit loading purposes, knowledge of the sensitivity level of each receiver may also be desired. Preferably, the data transmitted also includes the sensitivity level of each receiver. In one embodiment, the sensitivity level is represented using a reduced number of bits, allowing more of the available bandwidth to be used for data transmission purposes.

In addition to conveying the transmitted power level, it may also be desirable to convey in the transmitted data the manner of bit loading performed. However, this may represent a relatively large amount of overhead data to be added to the transmitted data. For example, in the 802.11 standard, there may be 48 tones, and 8 possible data rates for each tone representing 384 possible bit loading configurations. Accordingly, in one embodiment of the present invention, the receiving station may keep track of the previous bit load information received from previous data transmissions. Preferably, if the bit load has not changed this information could be conveyed with a single bit, thereby reducing the amount of overhead data.

In another embodiment, the information regarding the manner in which bit loading was performed may be compressed to reduce the amount of overhead data. One method may utilize run length encoding by compressing strings of repeated characters or different characters.

In another embodiment that reduces the overhead required to transmit the bit loading information, adjacent tones may be grouped together and considered jointly. For example, in the 802.11 standard, the 48 tones may be grouped into 24 groups with 2 tones per group. If each group is restricted to one loading rate, then the information needed to represent the loading rates over the bandwidth of the channel is reduced by a factor of two.

As was mentioned previously, coherence time may affect the validity of channel estimations. If a station has data to transmit, but has not received an estimation of the channel for quite some time, a comparison may be made between the elapsed time and the coherence time to determine if the current estimation is still valid. Accordingly, the transmitter may choose not to perform the bit loading if the elapsed time is greater than the coherence time so that tones may be loaded equally. Alternatively, an adaptive algorithm may also be used which employs bit loading techniques but converges to uniform tone loading over time.

Figure 4:
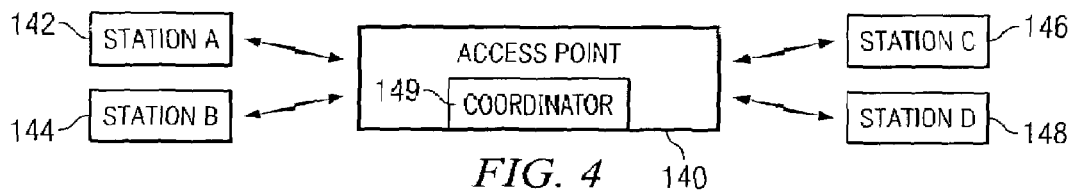
FIG. 4 shows a possible wireless network.

Referring to FIG. 4 for continued context, a wireless network comprises a plurality of stations 142–148, designated in FIG. 4 as Station A–D, respectively. The network also includes an access point (AP) 140, which provides connectivity to a wire- and/or wireline-linked distribution system. The AP 140 further contains a "coordinator" 149 which preferably performs bandwidth management and scheduling on the wireless medium.

The preferred embodiments of the present invention provide the ability to configure the PHY of a wireless station to implement either a SISO or MIMO antenna configuration. The 802.11 standard includes a number of control, management and data frames, some of which are used to coordinate the schedule for stations and access points to communicate with one another.

As described above, wireless networks may include multiple wireless stations contending for control of the channel. Various methods exist for assigning control and are commonly referred to as "coordination functions." In a point coordination function (PCF), the AP coordinates control by polling stations A–D. As the stations respond, the AP 140 determines which station will transmit on the channel next. Another access method, called a hybrid coordination function (HCF) is described in the 802.11e amendment to the 802.11 standard. In HCF, transmission opportunities (TX-OPS) are issued to the stations, and can be issued at specific times in order to guarantee certain service rates, allowing the transfer of QoS data. Consequently, in PCF and HCF modes, the AP and the next station to control the channel exchange initialization data prior to the transmission of data. In accordance with the preferred embodiments of the present invention, coordination function information that is transmitted to assign control to stations may be used to obtain measurements of the channel characteristics. Using the knowledge of the channel characteristics the station preparing to transmit data can determine the transfer rate and also determine the modulation and code rate of each tone to be transmitted. One advantage of such a scheme is that it yields a gain in throughput because the overhead used in measuring channel characteristics has been folded into the channel coordination functions.

Typically, in HCF mode, the AP 140 may choose to transmit the complete data frame 20. However, according to one embodiment of the present invention, the data 28 of the data may be delayed until the AP receives acknowledgement frame 22 from the responding station. For example, suppose that the AP determines that the channel is clear and sends out a transmission opportunity (TXOP). At this point the AP may not be aware of the specific channel it is transmitting on. As such, the AP may wait to send the poll plus data 28 of the data frame 20 until after the TXOP or poll arrives at the station thereby allowing channel optimization (e.g., bit loading) to be used in sending data 28. In response, the station preferably would bit load an acknowledgement frame 22 that may or may not include data 34. Subsequently, the AP could determine from the information in the acknowledgement frame 22 the loading characteristics to be used in communicating with the station, where the information in the acknowledgement frame 22 preferably includes the transmitted power levels. Preferably, if the bit loading has not changed between the AP and the station this information could be conveyed with a single bit, thereby reducing the amount of overhead data. For example, if the bit were high, then this would imply that the bit loading distribution had not changed, but if the bit were low then this would imply that a new bit loading distribution had been used.

In another embodiment, a request to send (RTS) signal may be sent in the channel, and if there are no stations currently transmitting then a clear to send (CTS) signal may be sent in response to the RTS signal. Accordingly, channel measurements may be performed on the RTS and CTS signals to estimate, among other things, the signal gain along each tone of the channel. Subsequently, bit loading may be performed on the tones to reflect the channel characteristics represented by the RTS and CTS estimations.

Stations employing the 802.11 standard may receive superfluous frames from the AP which are not intended for that particular station. In one embodiment of the present invention, a station may continuously monitor the superfluous frames to determine where the frame came from—e.g., by examining the header 26, 32 of the frame. If the source of the frame is determined to be the AP, then the frame may be analyzed to estimate the channel characteristics from the AP to that particular station. In this manner, the next time that station transmits data to the AP, the channel characteristic will be known in advance by using information in the superfluous AP transmissions which may not have been intended for that particular station.

Figure 5:
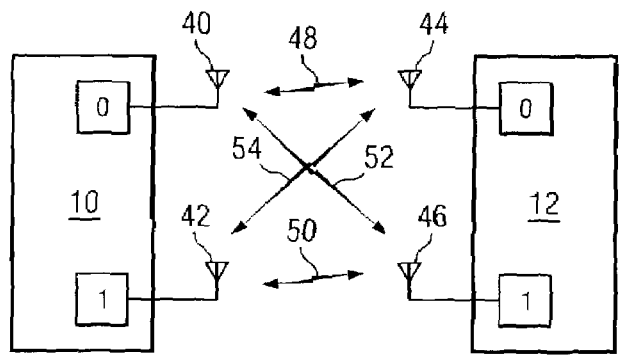
FIG. 5 shows an exemplary multiple input, multiple output arrangement.

The techniques described herein are also applicable to MIMO, MISO, and switched diversity systems. In such systems, there are multiple channels. For example, FIG. 5 shows four channels, 48, 50, 52, and 54. In systems with multiple transmit antennae, header information may be added to indicate the source of a transmission. In this manner, the receiver may interpret this header information and determine the particular channel that the receiver may be currently estimating.

For example, referring to FIG. 5, antenna 40 may have a 0 bit associated with it, antenna 42 may have a 1 bit associated with it, antenna 44 may have a 0 bit associated with it, and antenna 46 may have a 1 bit associated with it. Accordingly, communications between station 10 and station 12 may occur from antenna 40 to antenna 44 along communication link 48, and as such, '00' may be included in the transmitted data to indicate the antenna configuration of the sending and receiving stations. Likewise, if communications between station 10 and station 12 occur along communication link 50 using antennas 42, 44, then '11' may be included in the transmitted data to designate the antenna configuration. Preferably, the antenna configuration for MIMO systems is included in the preamble 24 portion of the data frame 20. Thus, with the transmitting and receiving station antennas known, the channel may be characterized for optimization purposes as was described above. For example, if antenna 46 detects a frame that originated at antenna 40 and was intended for antenna 44—i.e., antenna configuration equal 00—then, although this frame may not be intended for antenna 46, it may still be used to characterize the channel between antenna 40 and antenna 46.

The above discussion is meant to be illustrative of the principles and various embodiments of the present invention. Numerous variations and modifications will become apparent to those skilled in the art once the above disclosure is fully appreciated. Accordingly, aspects of the embodiments may be combined together in various forms to achieve desirable results. It is intended that the following claims be interpreted to embrace all such variations and modifications.

What is claimed is:

1. A method of communication, comprising:
   transmitting data over a wireless channel using a first station, wherein the channel comprises tones;
   receiving the data using a second station;
   estimating the wireless channel using at least information digitally encoded into the received data indicating a transmit power level used on the received data;
   allocating subsequently transmitted data among the tones according to the channel estimation; and
   transmitting the allocated data.

2. The method of claim 1, wherein the transmitted and the allocated data include training sequences used for the estimation.

3. The method of claim 2, wherein estimating the wireless channel comprises calculating signal-to-noise ratio.

4. The method of claim 3, wherein allocating subsequently transmitted data includes assigning the allocated data to the tones having higher signal-to-noise ratios.

5. The method of claim 2, wherein the transmitted data and the allocated data represent data frames and the training sequences are included within a preamble in the data frames.

6. The method of claim 5, wherein estimating the wireless channel includes computing a cumulative average of channel estimation over multiple frames of data.

7. The method of claim 6, wherein estimating the wireless channel includes calculating signal-to-noise ratio.

8. The method of claim 1, wherein the transmitted data and the allocated data include the power levels of each transmission.

9. The method of claim 1, wherein the allocated data includes the manner in which data was allocated among the tones.

10. The method of claim 9, wherein allocating subsequently transmitted data includes uniform allocations among the tones.

11. The method of claim 10, wherein the allocated data includes a single bit to indicate that uniform allocations have been performed.

12. The method of claim 9, wherein allocating subsequently transmitted data includes compressing data among the tones.

13. The method of claim 1, wherein the calculations are valid for a predetermined period of time.

14. The method of claim 13, wherein the allocated data is not allocated among the tones if the channel estimation are invalid.

15. The method of claim 13, wherein the allocated data is allocated equally among the tones prior to reaching the predetermined period of time.

16. The method of claim 1, wherein the first and second stations include a plurality of antennas and the data includes the antenna configuration information to designate which antennas are being used for transmission and reception of data.

17. A wireless network, comprising:
a first station that transmits data over a wireless channel, wherein the channel comprises tones; and
a second station that receives said data, performs calculations on said data to characterize the channel, and allocates subsequent data transmissions among the tones according to the calculations, wherein channel characterization is based at least in part on information digitally encoded into the received data indicating a transmit power level used on the data transmitted by the first station.

18. The wireless network of claim 17, wherein transmitted data includes training sequences used for calculations.

19. The wireless network of claim 17, wherein the calculations include computing a cumulative average over multiple frames of data.

20. The wireless network of claim 17, wherein transmitted data includes the power level of each transmission.

21. The wireless network of claim 17, wherein subsequent data transmissions include the manner in which data was allocated among the tones.

22. The wireless network of claim 17, wherein the calculations are valid for a predetermined period of time.

23. The wireless network of claim 17, wherein the first and second stations include a plurality of antennas and transmitted data includes antenna configuration information to designate which antennas are being used for transmission and reception of data.

24. A wireless network, comprising:
an access point;
a plurality of stations coupled to the access point using a wireless channel, wherein coordination data is exchanged between the access point and the plurality of stations to coordinate which station has control of the channel; and
wherein the coordination data is also used to obtain channel characteristics, wherein an indication of transmit power level used on the coordination data is digitally encoded into said coordination data.

25. The wireless network of claim 24, wherein the channel characteristics include signal-to-noise ratio.

26. The wireless network of claim 24, wherein the channel further comprises tones, and the channel characteristics are utilized to allocate data among the tones.

27. The wireless network of claim 26, wherein transmission of data between the access point and the station controlling the channel does not occur until the configuration data has been used to allocate data among the tones.

28. The wireless network of claim 26, wherein the subsequent transmissions include a single bit to indicate that similar allocations have been utilized.

29. The wireless network of claim 24, wherein a station utilizes coordination data intended for another station to obtain measurements of the channel characteristics.

30. The wireless network of claim 29, wherein the station examines a header of the configuration data to determine if it came from the access point and if so then the station estimates the channel characteristics using the configuration data.

31. The wireless network of claim 30, wherein the channel further comprises tones, and the channel characteristics are utilized to allocate data among the tones.

32. The method of claim 1, wherein the allocated data includes at least one bit indicating whether a present allocation of data has been changed from a previous allocation.

* * * * *